UNITED STATES PATENT OFFICE.

MAXIMILIAN J. REUSZ, OF CONTINENTAL, MISSOURI, ASSIGNOR OF ONE-FIFTH TO CHRISTIAN F. SCHNEIDER, ONE-FIFTH TO J. C. JOSSE, ONE-FIFTH TO F. R. LOVERIDGE, AND ONE-FIFTH TO J. B. TURPIN, ALL OF ST. LOUIS, MISSOURI.

ANTIFREEZING SOLUTION.

1,319,178.     Specification of Letters Patent.     Patented Oct. 21, 1919.

No Drawing.     Application filed May 31, 1919. Serial No. 301,078.

*To all whom it may concern:*

Be it known that I, MAXIMILIAN J. REUSZ, a subject of the Empire of Germany, and resident of Continental, St. Louis county, Missouri, have invented certain new and useful Improvements in Antifreezing Solutions, of which the following is a specification.

This invention relates to improvements in an anti-freezing solution to prevent liquids from freezing at a low temperature.

It can be used also for fire proofing, and water proofing of ordinary inflammable materials, fire extinguishing, dust proofing and hardening road surfaces, making the road bed hard and dust proof.

The essence of the invention is, to take calcium magnesium chlorid, preferably in the form of tachhydrite, $CaCl_2.MgCl_2.12H_2O$, and after dissolving it by applying heat thereto, dilute it with water to 17° to 50° Baumé, then add 6% by weight of a solution made from 5% sulfate of copper, 10% hydrate of lime and 85% water, then strain it through gauze to remove particles of foreign material. This strained solution is then mixed with the various substances to be treated.

This composition when added to water until it shows 17° to 54° Baumé, will prevent water from freezing at a temperature from 20 to 70 degrees below zero. This is essentially adapted for automobile radiators and for other purposes where it is necessary to prevent water from freezing.

For fire proofing, water proofing and fire extinguishing and dust proofing, the solution should show 30° to 45° Baumé.

To treat building brick, fire brick, cement products and the like, the raw material is first sprayed with the solution, thoroughly intermingled and then pressed in the shape desired. These articles when so treated need no burning or kiln treating process, but will become hard and durable enough when dry to withstand a blow pipe flame or test, they will remain intact and withstand the weather.

Cement products treated with this solution will withstand the action of sea water without destructive effect.

For fire proofing and water proofing the articles are saturated or thoroughly soaked in the solution.

Having fully described my invention what I claim, is:

1. A process of making an anti-freezing solution, comprising liquefying tachhydrite, adding thereto about 6% by weight of a composition containing approximately 5% copper sulfate and 10% calcium hydrate, diluting with water to 26° to 50° Baumé, and then straining the solution.

2. A process of making a solution for anti-freezing and other purposes, comprising dissolving hydrated calcium magnesium chlorid, and adding thereto a composition containing approximately 5% copper sulfate and 10% calcium hydrate and water in such proportion that the solution has a specific gravity of 26° to 50° Baumé.

3. An anti-freezing solution comprising a solution of calcium magnesium chlorid containing about 6% by weight of a composition containing approximately 5% copper sulfate and 10% calcium hydrate.

In testimony whereof, I have signed my name to this specification, in presence of two subscribing witnesses.

MAXIMILIAN J. REUSZ.

Witnesses:
CHRISTIAN F. SCHNEIDER,
ALFRED A. EICKS.